May 21, 1935. A. F. HANSON 2,002,007
SHEET FLASH WELDER
Filed May 3, 1932 5 Sheets-Sheet 2

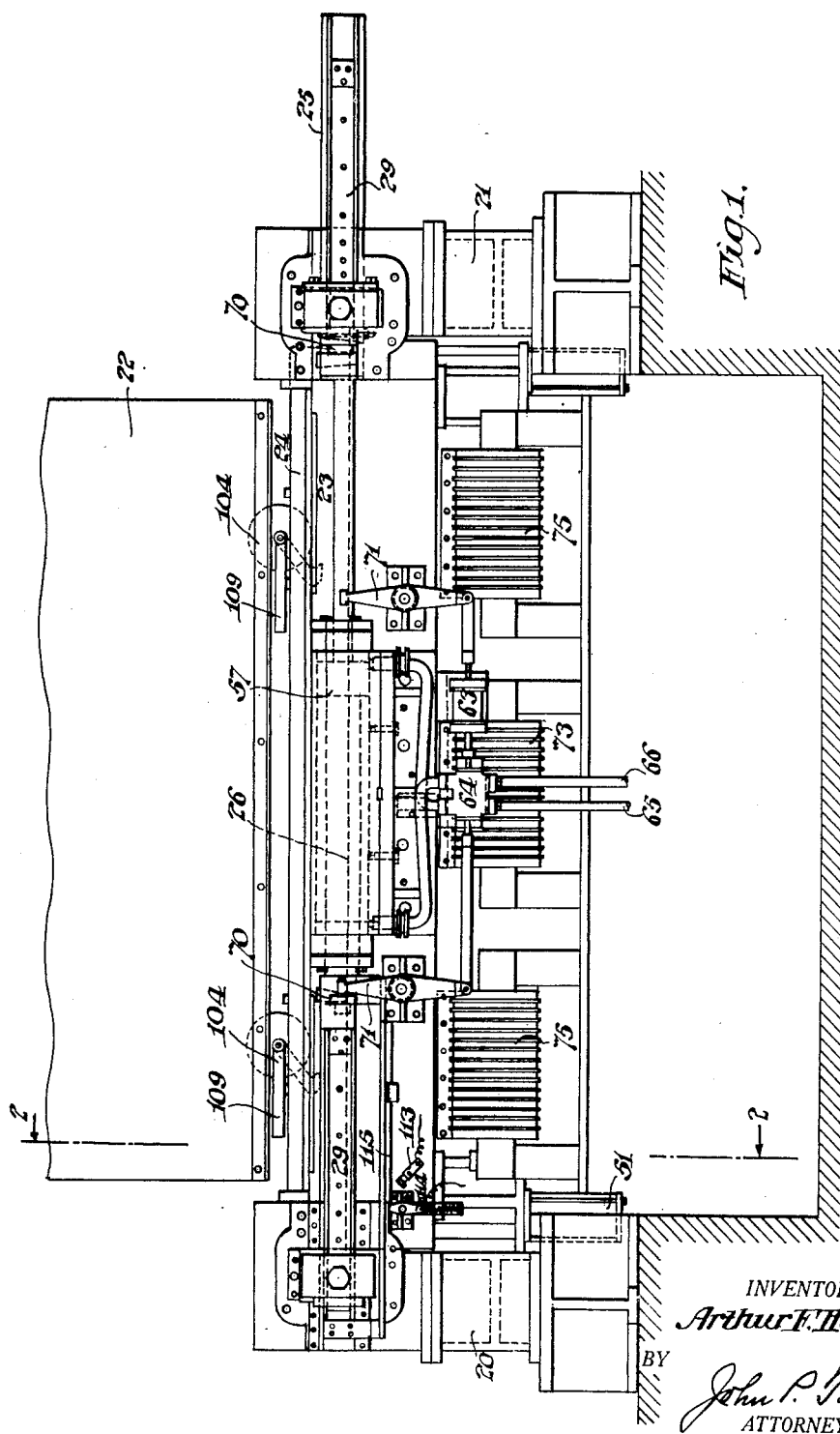

INVENTOR:
Arthur F. Hanson,
BY
John P. Barbox
ATTORNEY.

May 21, 1935.  A. F. HANSON  2,002,007
SHEET FLASH WELDER
Filed May 3, 1932  5 Sheets-Sheet 4
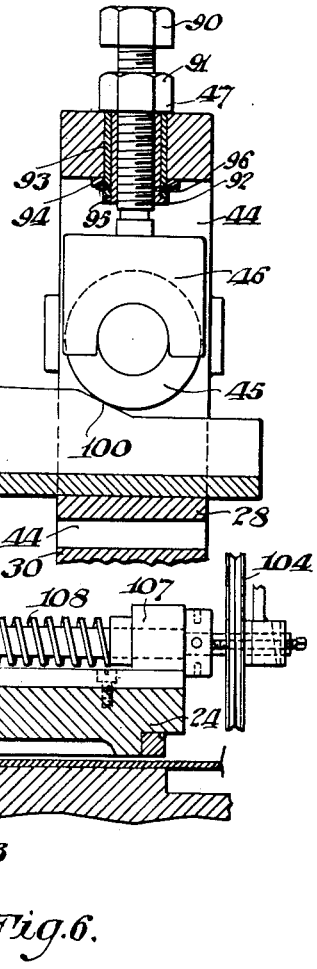
Fig.5.
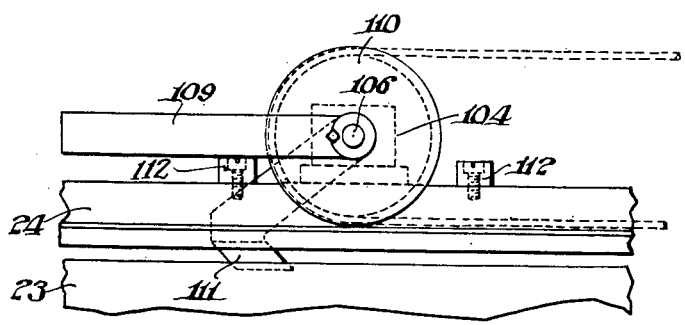
Fig.6.
Fig.7.
INVENTOR:
Arthur F. Hanson,
BY
John P. Tarbox
ATTORNEY.

May 21, 1935. A. F. HANSON 2,002,007
SHEET FLASH WELDER
Filed May 3, 1932 5 Sheets-Sheet 5

INVENTOR:
Arthur F. Hanson,
BY
John P. Tabor
ATTORNEY.

Patented May 21, 1935

2,002,007

UNITED STATES PATENT OFFICE 2,002,007

SHEET FLASH WELDER

Arthur F. Hanson, Philadelphia, Pa., assignor to Edward G. Budd Manufacturing Company, Philadelphia, Pa., a corporation of Pennsylvania Application May 3, 1932, Serial No. 608,880

19 Claims. (Cl. 219—4)

My invention relates to metal working machines and more particularly to machines adapted for use in the flash welding of extremely wide sheets.

The principal object of this invention is to construct a machine adaptable for such use which is compact, readily accessible for repairs and replacement of parts and which is capable of positioning the work with extremely great accuracy.

Other desirable objects relating to machines of this type relate to the method and apparatus for controlling the operation of the work holding parts and to the automatic control of the machine itself.

Numerous other and incidental objects will be apparent from the description thereof when considered in connection with the accompanying drawings.

I attain the above and other desirable objects by constructing a machine having relatively movable dies and a cam to control the die movement and means to transmit the control movement of the cam to the dies. I incorporate the above basic parts in co-operative combinations with the other patentable features of my device into a complete operative structure substantially as shown and described.

This invention will be better understood from the following description when considered in connection with the accompanying drawings wherein like ordinals represent corresponding parts in the various figures.

Fig. 1 is a view in elevation showing the assembled machine of this invention.

Fig. 5 is a partial cross section on the line 5—5 of Fig. 3.

Fig. 6 is a partial section through the relatively movable dies showing one of the improved gauges in association with the work.

Fig. 7 is a partial view in elevation looking between the work-holding members showing the approximate mounting of the gauge with respect to one of the movable parts.

Figures 2, 3:
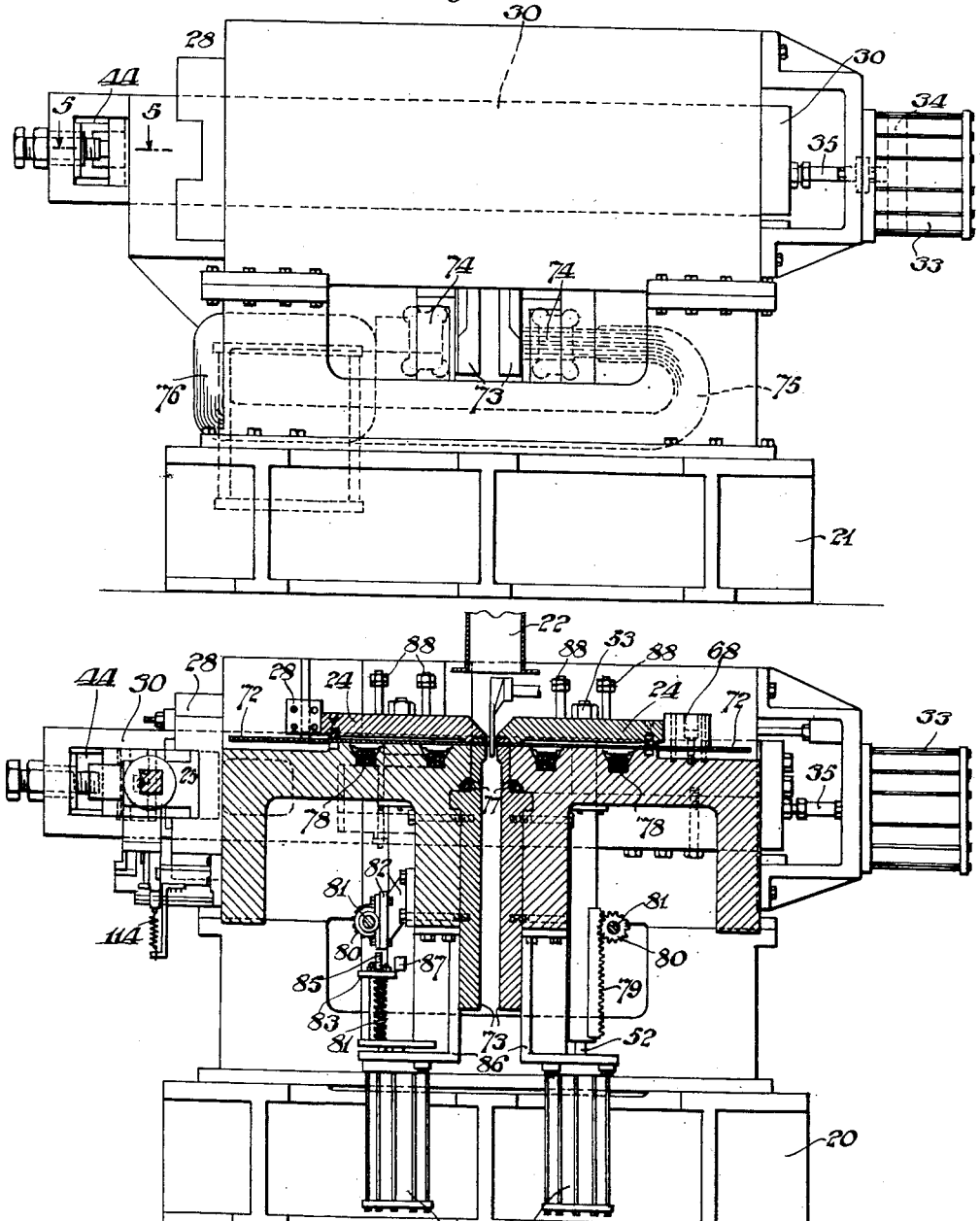
Fig. 2 is a section substantially on the line 2—2 of Fig. 1.
Fig. 3 is an end view of the machine.

In Fig. 1 I have shown the machine assembly constructed in accordance with my invention wherein the general operating parts are mounted upon and between supporting framework members 20 and 21. Above the center of the machine is the guard 22 adapted to carry off the sparks and heated particles of the work during the flashing operation. The stationary die member 23 is rigidly associated with the supporting framework and mounted in secured relation thereupon. Adapted for relative vertical movement with respect to the fixed die 23 is the upper clamp 24 shown in its lowermost or work engaging position. Mounted in suitable guide bearings upon the stationary die and frame structure is the cam member 25 having a plurality of control surfaces adapted to control the relative die movement. To obtain motion of the cam member a power means in the nature of a fluid motor 26 is used, which has been found to adapt itself most admirably to the nature of this cam operation.

Figure 4:
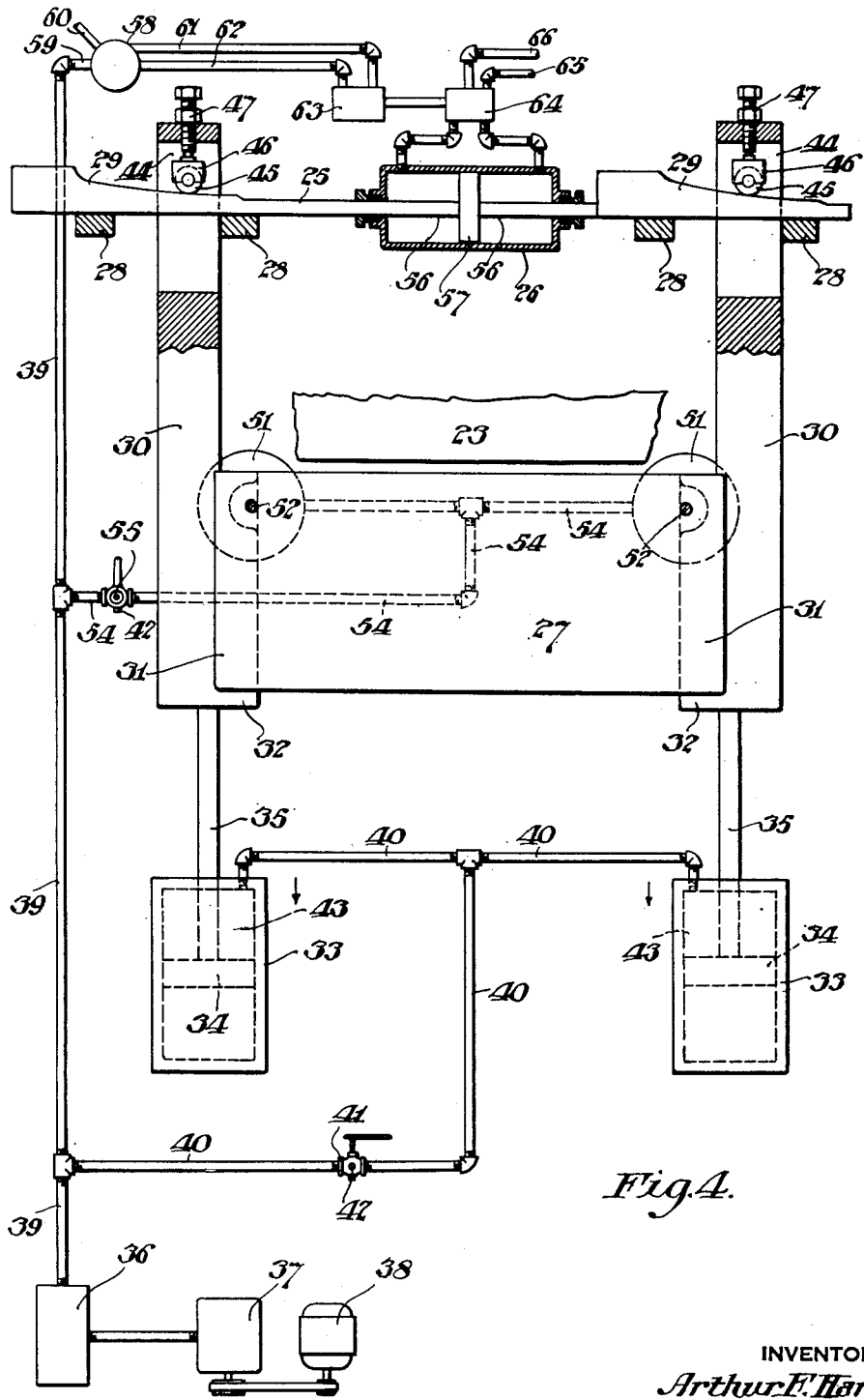
Fig. 4 is a schematic plan view of my machine.
Figure 8:
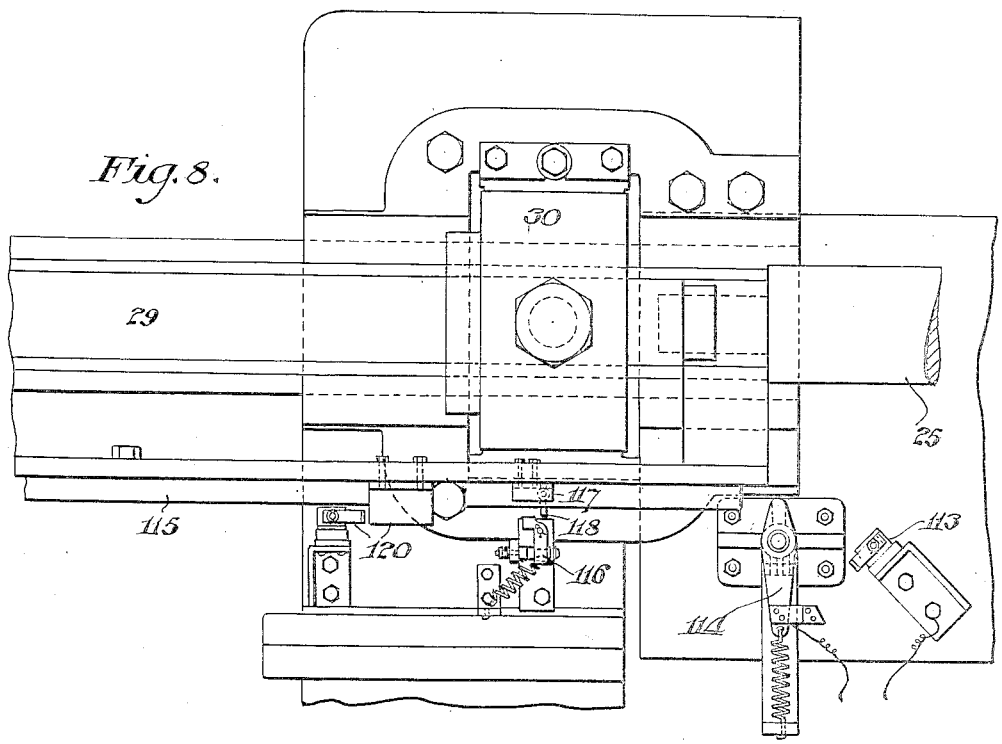
Fig. 8 is an enlarged view taken at the upper left hand side of Fig. 1 to show the cam and the associated electrical controls.
Figure 9:
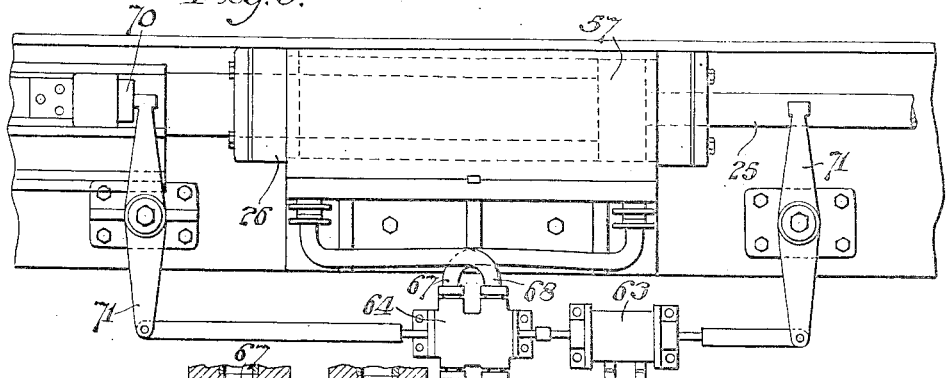
Fig. 9 is an enlarged detail section taken centrally of Fig. 1 showing the assembled cam operating mechanism and its operating control.

The cam motion is transmitted to the movable die member 27 by a means 30 co-acting with the cam surface and carrying the die member, as seen in Fig. 4. The basic operation of the machine may be readily observed from this figure by considering the schematic arrangement therein. The stationary die 23 partly shown, is mounted on a framework and rigidly secured to it. Upon this rigid framework are mounted the bearings 28 which receive the cam member 25 operated by the fluid motor 26. The cam is adapted for movement transverse in respect to the general machine body having a plurality of control surfaces 29 mounted in spaced relation upon the extremities of the said cam. To transmit the predetermined motion of the control surfaces 29 to the movable die member 27 a mechanism including a follower is used. This mechanism comprises the members 30 which slide upon the rigid framework by means of suitable plain surface bearings, not shown, and carry the movable die member 27 in a seat 31 formed integral with the main body of the member 30 and having an abutting shoulder 32 to insure a rigid connection to the die. The relative motion of the dies 23 and 27 must be absolutely accurate and pre-determinately controlled. Any slight variation in the movement of one side of these dies relative to the other may cause the working parts to abut against each other forming a good low resistance circuit between the two surfaces through which the entire welding current will pass. It is obvious that it will be impossible to re-start the arc under these circumstances and it is likewise impossible to separate the two sheet members and what is known as a stall will occur and the work parts will be utterly valueless. Such a condition may be caused by such slight disturbances as a piece of foreign matter becoming impressed upon the cam control surface. When the roller comes along, the foreign material causes undue movement of one side of the die in respect to the opposite side and the work is spoiled. It is readily obvious that this type of action may easily occur in a machine capable of welding sheets of a width in the nature of 100 inches because the operating parts in the machine must be further apart in spaced relation than the maximum width of the sheets. This difficulty is overcome by means of a very novel arrangement comprising pneumatically controlled motors 33 which are rigidly secured to the stationary framework of the machine body and have the piston 34 connected by means of a connecting rod 35 to the member 30. During the operation of the machine and at all other times except when repairs are being made the pneumatic pressure is maintained upon these pistons forcing them in the direction of the arrows as shown. This enables the follower mechanism to be held yieldably against the cam surface. Yieldably is herein used in the sense that although the hydraulic motor 26 is capable of forcing the cam to the right or left and the member 30 is firmly held against the cam surface, it will yield to the cam movement, but any intervening foreign material will not pass under the cam roller or follower. A suitable source of compressed air or other fluid under pressure is maintained in the reservoir or storage tank 36 by means of a compressor 37 indicated as being driven by an electric motor 38. Supply reservoir 36 is connected to a suitable feeder piping 39 which is tapped at various points to supply fluid to the operating parts of the machine. The pneumatic motors 33 are supplied by means of the piping 40 having a three-way hand-controlled valve 41, one of the ports 42 opening to the atmosphere. In this manner the pneumatic pressure may be maintained upon the pistons at all times except when repairs are to be made. At such a time the valve is moved to closed position as far as the feeding line 40 is concerned and the cylinders 43 are exhausted to the atmosphere by means of the port 42 in the hand-controlled valve. It is to be especially pointed out with regard to this part of the apparatus that this yielding resistance to the cam movement is maintained at all times so that there will be no possibility of the follower moving away from the control portions of the cam resulting in a jerky motion.

The member 30 which transmits the cam movement to the movable die has at the cam engaging end a slot or aperture 44 which has housed therein the follower mechanism containing several of the novel features of my invention. This mechanism comprises broadly a roller 45 for contacting with the cam surface, a yoke 46 supplying bearings for the roller and the adjustable mechanism 47 mounted within or adjacent the slot 44.

The work parts are fastened to the relatively movable die members 23 and 27 by means of the clamps 24 which are relatively movable with respect to the die members. The relative motion of these clamping members is obtained by a plurality of synchronized pneumatic cylinders 51 located beneath the dies and having suitable connecting rods 52 secured in rigid relation to the clamp 24 by means of the bolts or studs 53, as seen in Fig. 2. The cylinders 51 are operatively connected to the penumatic supply line 39 by means of piping 54 and a hand-operated valve 55 similar to the connections for the pneumatic motors 33. The operation of the pneumatic motors 51 is different from the operation of the motors 33, in that, they are raised and lowered to clamp or allow the work to be removed and are operated by means of hand-control as shown, or by means of automatic mechanism which may be in the nature of bell-cranks and toggles operated due to the motion of the cam member 25. The vertical movement obtainable by the pneumatic motors is specifically limited so that the lowermost position obtained by use of the said motors places the clamp approximately three-eighths of an inch above the die member. This relative positioning of the parts allows the work to be gauged and positioned accurately with respect to the machine. After this has been done the clamps are rigidly secured to the work and the dies by means of electro-magnets.

The operation of the machine thus far may be described as follows: The sheets to be welded are fed through the machine from the side having the movable die member 27, one sheet being placed upon the stationary die 23 and the other upon the movable die 27. The clamping members 24 are lowered into relative position and the work gauged accurately after which the clamps are firmly held by the electro-magnetic means. After this the pneumatic motor 26 is caused to operate moving cam 25 from left to right thereby causing relative approach movement of the dies. At the beginning of the cam movement the power circuit is closed supplying welding current to the electrodes which contact with the work and when the arc is initially started the flashing operation commences and continues along the whole surface of the plates until a substantially parallel edge relation is obtained. After this condition has occurred what is known as the push-up occurs, the two sheets are forced together and the welding current shut off. The clamps are released and the resulting single sheet metal part is removed. This operation may be continued in the manner described substantially continuously.

Figure 10:
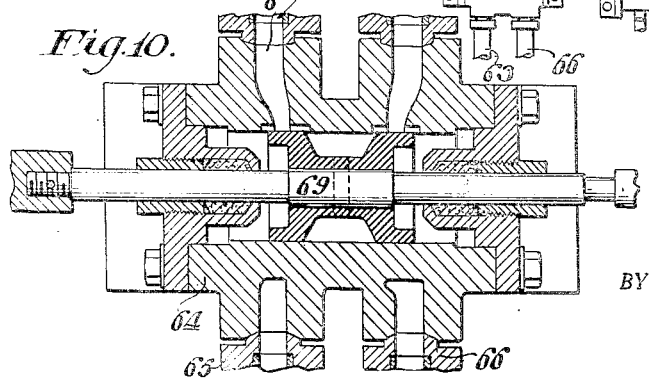
Fig. 10 is a cross section of the control valve for the cam power means.

The operation of the wedge-shaped cam 25 having dual control surfaces 29 is obtained through the pneumatic motor 26 interposed between the control cam surfaces and connected thereto by means of piston rods 56 and the piston 57. The basic control of this pneumatic motor is obtained by means of a hand-operated valve 58 having an inlet connection 59 from the supply pipe 39 and a connection 60 exhausting to the atmosphere. The connections 61 and 62 go to opposite sides of the pneumatic motor 63 and are capable of being connected to either the supply connection or the exhaust connection. In this manner the piston within the member 63 is caused to move to the right or left thereby positioning the valve member 69 within the housing 64. The function of the valve 64 is to control by means of limiting the fluid passage therethrough the operation of the pneumatic motor 26. During the inoperative or idle position of the machine the hydraulic fluid flows in through the connection 65 interiorly of the valve in its neutral position as shown in Fig. 10 and out by return pipe 66. Its uninterrupted passage continues so long as the valve remains in neutral position. When the motor 63 is caused to operate, the valve member 69 of Fig. 10 is moved to one of its operative positions, the free passage between the inlet and outlet ports is interrupted thereby causing the fluid to flow directly through the valve and out of the passage 67 through the pipe connection to the right-hand side of the motor 26. The pressure begins to build up and forces the piston 57 to the left thereby moving the cam and causing the approach motion of the dies. The movement of the piston 57 continues until the cam has reached a predetermined position at which time one of the limit stops 70 secured thereon engages one of the fulcrum levers 71 thereby returning the valve 69 to its neutral position. This releases the pressure within the motor 26 and exhausts the cylinder at the same time. The clamps holding the work are now released and the motor 63 is again caused to operate, this time controlling the valve 69 in such a fashion as to cause the motor 26 to move to the right. Movement of the cam to the right again continues until a pre-determined position is reached at which time the limit stops 70 again co-operate with one of the fulcrum levers 71 to cause the control valve 64 to be returned to mid position thereby resetting the mechanism for another operation.

In Figs. 2 and 6 the work sheets 72 are shown in section, positioned upon the die members 23 and 27 and in secured relation thereto by means of the clamps 24. The die members 23 and 27 have upon their approach surfaces the electrodes 73 supplying welding current to the work members 72 through their contacting edges. The electrodes 73 are supplied with power by means of the connections 74 and leads 75 of the transformers 76. As viewed in Fig. 1 it may be readily ascertained that the welding current is supplied by means of a plurality of transformers. However, this is merely a matter of expediency and it is necessarily determined by such controlling factors as the amount of power and size of the machine, etc. For purposes of maintaining the electrodes relatively cool, a set of cooling medium conveying passages 77 are used.

In the upper surface of the die members 23 and 27 are mounted a plurality of electro-magnets the windings of which are visible in section in Fig. 2 at 78. These magnets correspond in number to the needs of a machine of the width necessarily inherent in structures of this type. Their function is to hold the clamps 24 rigidly to the dies. To prevent the clamps from slipping during the push-up of the machine suitable stops 68 are mounted rigidly with respect to the die members to serve for backing purposes and thereby transmitting the die movement equally as respects the die and the clamp. These members are made of hard material to prevent wear.

The cylinders 51 positioned at either end of and under the relatively elongated dies are synchronized by means of a ratchet 79 secured to the connecting rod 52 of each cylinder. These ratchets mesh with a pinion 80 mounted upon the shaft 81 which extends all the way across the machine while being supported on the die interiorly by means of the structural members 82. Although the drawing of Fig. 2 does not show the same construction on either side, with regard to this mechanism, the purpose of this expedient is to show in one figure the mechanism at various parts of the machine. The complete synchronizing mechanism transversely of the machine is necessarily the combined mechanisms shown at either side of the drawings. Shown on the left hand side is the stop mechanism 83 which consists essentially of the spring 84 concentric with an elongated bolt 85 rigidly secured to the die structure by means of the L connections 86. This mechanism is adapted for co-operation with an abutting lug 87 secured to the ratchet mechanism the purpose of which is to hold the clamp 24 yieldably above the work about three-eighths of an inch. This allows of positioning in gauging of the sheets prior to the clamping operation. The relatively short distance is also susceptible of use in connection with the magnets 78 which retain the clamps in secured relation to the work. The vertical movement of the die members 24 is limited by means of a plurality of stops 88 generally provided with cushioning members to dampen the limiting motion. These members are adjustable as would be desirable.

The mechanism adjustably supporting the follower 45 in contact with the cam has several important features with regard to this apparatus, the first of which is the adjustable feature 47 which comprises a main member 90 screw-threaded with a flat-nosed portion for co-action with the yoke holding the follower. The locking nut 91 is retained on the member 90 for its customary use. Concentric with the member 90 and in threaded relation thereto is a bushing 92. This member is placed in pressed fit relation with regard to the bushing 93 which has a shoulder 94 positioned concentrically of bushing 92. Between the shoulder 94 of the bushing 93 and the shoulder 95 of the bushing 92 is a washer member 96 which is adapted to sustain a load in shear substantially equal to the highest safe working load of the various machine parts. This characteristic of the apparatus is especially adapted for protection of the cam surfaces and other vital parts of the machine during the exigency of abnormal circumstances. Should a foreign object become positioned between the relatively movable die surfaces or between the cam and the follower at a time when the machine is in operation, the necessary consequence would be the destruction of some part. The member 96 is adapted to act as a safety valve under these circumstances. Thus by the mere replacement of a relatively inexpensive washer the machine may again be adapted for use, whereas had the construction not been used, it would have been necessary to replace an expensive machined cam surface, a die surface or some other equally vital part of the machine.

The contour of the cam control surface 29 has a portion 100 adapted to take up the initial space between the gauged working parts. After this initial take-up the gradually tapered surface 101 controls the die approach during the flashing operation until the parts have flashing parallel edges at which time the push-up takes place due to the cam surface at 102. Immediately subsequent to the push-up the welding current is shut off and the machine comes to rest due to the control mechanism.

In Fig. 1 the inter-die work gauges 104 are shown in gauging position. These gauges are shown in more detail in Figs. 6 and 7. They comprise essentially a lever arm 105 concentrically and rotatably mounted upon an axis 106 secured in suitable bearings 107 and mounted upon the fastening clamps of the stationary side of the machine. Concentrically of the axle 106 is mounted a spring member 108 adapted to allow the gauge to give, if it has remained in place between the working parts after the machine has started in operation. This spring allows the gauge to move axially and upon the release of the parts move back into proper calibrating position. Upon the outer end of the axle is mounted a lever 109 adapted to rotate the gauge about its axis. Adjacent the lever is a pulley wheel 110 adapted to receive a rope, chain or other mechanism for the purpose of obtaining simultaneous operation of the multiple number of gauges upon the machine. This feature may or may not be used.

The calibrating parts of the gauge 111 are of divergent dimension in cross section. This feature allows the work to be divergently positioned in a manner so that the flashing operation starts at one end and gradually works along the entire working surface of the parts. The transverse shape of the gauge, as visible in Fig. 7, has a section substantially in the nature of a rhomboid. This construction adapts the gauge for positioning and withdrawal between the work sheets in an arcuate manner, concentric with the axis of the gauge in such manner that the gauge is withdrawn from between the working parts entirely through or within the previously gauged area. In this way there is no danger of the gauge becoming caught with the slightly bent or distorted edge of the work resulting in a jammed mechanism. The members 112 serve as suitable limit stops for the lever 109 either in gauging position or retracted position.

In order to control the welding circuit of the machine co-ordinate with the operation of the die movement, suitable control mechanisms are mounted upon the framework and adapted for co-operative co-action with the cam to accomplish this result. This mechanism comprises especially fixed contact 113 and movable contact 114. When these two contacts are closed, due to the left-hand movement of the cam, the welding transformers are energized immediately after the beginning of cam movement. This is accomplished by means of the bar 115 which engages the upper part of the movable contact member 114 throwing it into closed circuit position with the switch contact 113. Upon the return movement of the cam this co-action between the member 115 and the movable member 114 also takes place but at this time the member pivots in the opposite direction so that the welding circuit is not closed thereby accomplishing in one simple mechanism what has previously been accomplished by a complicated mechanism having a large number of parts.

To the left of the welding control are a number of switches for co-operation with the clamp energizing magnets. The first switch 116 is normally closed and is placed in the one side of the energizing magnetic circuit. When the cam has reached its pre-determined position the member 117 carrying the pivoted pawl 118, causes the switch to open thereby breaking the magnetic circuit. Immediately after the pawl has passed beyond the switch engaging position this switch closes again and in co-operation with the switch 120 closes the circuit in reverse direction. In this manner as soon as the zero point of the magnetic characteristic of the parts occurs, the inherent opposition to compression of the springs 84, and any residual pneumatic pressure in the cylinders 51 will cause the magnetic clamps 24 to be raised out of work-engaging position. At this time the work may be removed and new working members placed in the machine and the operation thereof continued. The switch 116 is not opened when the cam starts its reverse motion because the pawl 118 pivoted on the member 117 is adapted to pivot on its axis and not transmit any force to the switch members. The switch 120 opens upon the retrograde cam movement and the magnets are again de-energized.

In the nature of a brief résumé of the machine operation; the work parts are positioned upon the dies, the gauges are brought down into inter die position and the work calibrated, then the clamps are fastened to the work. The inter-die gauges are removed and the die movement is initiated by means of the cam operating mechanism. Shortly after the initiation of the cam movement the current is turned on and the welding operation begins. Upon the completion of the operation the welding current is shut off and the work fastening clamps are released, the work is withdrawn from the machine and the cam is moved back in its idle or inoperative position, at which time additional sheets may be placed in the machine. It is readily apparent that the various figures and views are entirely unrelated as to dimension or proportionality. The machine is illustrated in a manner which is deemed to the best advantage to show the various co-operative arrangements without applying the entire mechanism to any individual figure.

The various parts of my device are susceptible of modification and I aim to cover in the hereto appended claims all such modifications which are within the true spirit and scope of my invention.

I claim as my invention:

1. In a flash welding machine opposed relatively movable dies and a multiple number of inter-die gauges having inter-work calibrating sections of divergent dimension thereby adapted to divergently position the work and of transverse shape adapted for accurate withdrawal concentrically of the gauge axis and entirely thru the gauged area.

2. In a flash welding machine opposed relatively movable dies and a multiple number of inter-die gauges having inter-work calibrating sections of divergent dimension thereby adapted to divergently position the work and of transverse shape adapted for withdrawal entirely within the gauged area.

3. In a flash welding machine opposed relatively movable dies and a multiple number of simultaneously operable inter-die gauges having inter-work calibrating sections of divergent dimension thereby adapted to divergently position the work and of transverse shape adapted for accurate withdrawal concentrically of the gauge axis and entirely through the gauged area.

4. In a metal working machine opposed relatively movable work holding dies and a multiple number of inter-die gauges having inter-work calibrating sections of divergent dimension adapted to divergently position the work and being of substantially rhomboidal transverse shape thereby adapted for accurate withdrawal concentric with the gauge axis entirely through its gauged area.

5. In a flash welding machine, the combination of relatively movable fixed and stationary dies, a master cam transversely slidably associated with said fixed die, interconnecting means secured to said movable die and controllably associated with said cam surface, means forcing said dies apart and yieldably opposing said cam motion, follower means associated with the control surfaces of said cam and interposed between said cam and said interconnecting means, and adjustable means interposed in said last-named means between the follower and said interconnecting means.

6. In a flash welding machine, the combination of relatively movable greatly elongated dies, a master wedge shaped cam to control the die movement and arranged for motion transversely to said relative die motion, and means adapted to co-act with the cam and transfer the movement thereof to the die.

7. In a flash welding machine, the combination of relatively movable greatly elongated dies, a master cam to control the die movement and arranged for motion transversely to said relative die motion, means adapted to co-act with the cam and transfer the movement thereof to the die and means arranged to co-act with said cam in one direction of motion only to control the welding current in accordance with said cam movement.

8. A welding machine comprising relatively movable sets of relatively movable transversely elongated welding dies, fixed and movable supports respectively for the opposed sets of said dies, a wedge shaped cam associated with said fixed support and adapted for transverse movement thereon, and means continuously yieldably holding the follower in cam engagement and adapted to transmit the movement thereof to the movable support and move the same in predeterminate parallel relation to said fixed support.

9. A welding machine comprising relatively movable sets of transversely elongated welding dies, a fixed support for one set of said dies, a movable support for the other set of said dies, a wedge shaped cam associated with and adapted for transverse movement on said fixed support, and means co-acting with and continuously yieldably resisting said cam movement and adapted to transfer the movement thereof to said movable support.

10. A welding machine comprising relatively movable transversely elongated welding dies, a rigid support for one of said dies and a movable support for the other of said dies, a wedge shaped cam adapted to move said movable support with predeterminate speed parallel towards the other support, work holding clamps above the dies, pneumatic means adapted to raise and lower said clamps, and magnetic means adapted to hold said clamps rigidly to the dies.

11. A welding machine comprising relatively movable transversely elongated welding dies, a rigid support for one of said dies and a movable support for the other of said dies, a wedge shaped cam adapted to move said movable support with predeterminate speed parallel towards the other support, work holding clamps above the dies, pneumatic means adapted to raise and lower said clamps, means adapted to yieldingly position said clamps relative to the die, and magnetic means adapted to hold said clamps rigidly to the dies.

12. A welding machine comprising relatively movable sets of transversely elongated welding dies, a fixed support for one set of said dies, a movable support for the other set of said dies, a wedge shaped cam associated with and adapted for transverse movement on said fixed support, and means co-acting with and yieldably holding the follower in cam engagement and adapted to transfer the movement thereof to the movable support.

13. A welding machine comprising relatively movable transversely elongated welding dies, a rigid support for one of said dies and a movable support for the other of said dies, a cam adapted to move said movable support with predetermined speed parallel towards the other support, work holding clamps above the dies, means below the dies adapted to raise and lower the clamps, and means adapted to hold said clamps rigidly to the dies.

14. A welding machine comprising relatively movable transversely elongated welding dies, a rigid support for one of said dies and a movable support for the other of said dies, a cam adapted to move said movable support with predetermined speed parallel towards the other support, work holding clamps above the dies, pneumatic means positioned below the dies and adapted to raise and lower said clamps, magnetic means adapted to hold the clamps rigidly to the dies, and means adapted to yieldingly position said clamps relative to the die and in the effective field of said magnetic means.

15. In a butt welding machine the combination of relatively movable greatly elongated dies, a cam having spaced control surfaces to control the die movement, and power means interposed between the control surfaces of said cam.

16. In a welding machine the combination of relatively movable greatly elongated dies, a wedge shaped cam to control the die movement, means including a power device to operate said cam, control means for said power means, and means associated with said cam adapted to control said power control means to limit the cam movement.

17. In a flash welding machine, the combination of relatively fixed and movable dies, clamping means associated with each of said dies, means arranged to raise and lower said clamping means, adjustable limit stops pre-determining the motion of said clamps away from said dies, yieldable means limiting the initial approach motion of said clamps, and electro-magnetic means determining the final working position of said clamps.

18. In a flash welding machine, the combination of relatively fixed and movable dies, clamping means associated with each of said dies, means arranged to raise and lower said clamping means, adjustable limit stops pre-determining the motion of said clamps away from said dies, yieldable means limiting the initial approach motion of said clamps, electro-magnetic means determining the final working position of said clamps, said raising and lowering means comprising a plurality of pneumatic motors associated with each of said clamps, connecting rods interconnecting said cylinders and said clamps, and means including rack and pinions associated with said connecting rods, simultaneously coordinating the motion imparted by said pneumatic motors.

19. In a flash welding machine, the combination of relatively fixed and movable dies, clamping means associated with each of said dies, means arranged to raise and lower said clamping means, adjustable limit stops pre-determining the motion of said clamps away from said dies, yieldable means limiting the initial approach motion of said clamps, electro-magnetic means determining the final working position of said clamps, said raising and lowering means comprising a plurality of pneumatic motors associated with each of said clamps, connecting rods interconnecting said cylinders and said clamps, and means including rack and pinions associated with said connecting rods, simultaneously coordinating the motion imparted by said pneumatic motors, a master cam slidably operable transversely to said relative die movement, said cam including a plurality of coordinated control surfaces, follower means associated with said control surfaces, means including yoke portions secured to said movable dies and said follower means, and a plurality of pneumatic cylinders individually associated with said interconnecting means and continuously urging said movable die away from said fixed die and holding said followers yieldably against said cam control surfaces.

ARTHUR F. HANSON.